United States Patent [19]

Pittman et al.

[11] Patent Number: 5,156,056
[45] Date of Patent: Oct. 20, 1992

[54] GYROSCOPE HAVING A SPECIFICALLY RESTRAINED PIEZOELECTRIC CRYSTAL

[75] Inventors: Roland Pittman, Pompton; Michael A. Napolitano, Mendham, both of N.J.

[73] Assignee: Condor Pacific Industries, Inc., Conoga Park, Calif.

[21] Appl. No.: 719,513

[22] Filed: Jun. 24, 1991

[51] Int. Cl.$^5$ .................. G01C 19/22; G01C 19/28
[52] U.S. Cl. ............................ 74/5.6 D; 74/5 F
[58] Field of Search .................. 74/5.6 D, 5 F, 5 R

[56] References Cited

U.S. PATENT DOCUMENTS

| | | | |
|---|---|---|---|
| 3,142,991 | 8/1964 | Pittman | 73/504 |
| 3,147,627 | 9/1964 | Hunn | 74/5.6 D |
| 3,283,594 | 11/1966 | Parker et al. | 74/5 R |
| 3,359,806 | 12/1967 | Pittman | 74/5.6 D |
| 3,668,502 | 6/1972 | Pilger | 74/5 F |
| 3,856,366 | 12/1974 | Weisbord et al. | 74/5 F |
| 4,030,371 | 6/1977 | Bulman et al. | 74/5 F |
| 4,061,043 | 12/1977 | Stiles | 74/5 R |
| 4,197,737 | 4/1980 | Pittman | 73/178 R |
| 4,211,951 | 7/1980 | Jensen | 310/329 |
| 4,270,392 | 6/1981 | Krupick | 74/5 F |
| 4,281,555 | 8/1981 | Schluntz et al. | 74/5.6 D |
| 4,285,248 | 8/1981 | Noar et al. | 74/5 F |
| 4,311,046 | 1/1982 | Pittman | 73/178 R |
| 4,386,535 | 6/1983 | Albert | 74/5.6 D |
| 4,596,158 | 6/1986 | Strugach | 74/5 F |
| 4,601,205 | 7/1986 | Pittman | 73/505 |
| 4,621,529 | 11/1986 | Pittman | 73/504 |
| 4,658,659 | 4/1987 | Gruber | 74/5 F |
| 4,715,227 | 12/1987 | Pittman | 73/504 |

FOREIGN PATENT DOCUMENTS

| | | | |
|---|---|---|---|
| 0166152 | 1/1986 | European Pat. Off. | 74/5 R |
| 0026709 | 2/1982 | Japan | 74/5 R |
| 0163915 | 7/1987 | Japan | 74/5 R |

OTHER PUBLICATIONS

"Small Two-Axis Sensor Has Multiple Uses", Barry Miller, *Aviation Week and Space Technology*, Aug. 8, 1966.
"A Gyro This Small? Really?", Litton, Guidance and Control Systems.

*Primary Examiner*—Rodney H. Bonck
*Attorney, Agent, or Firm*—Mathews, Woodbridge & Collins

[57] ABSTRACT

A gyroscope which comprises a gyroscopic element mounted to a base which is mounted coaxially to a spin motor. Preferably at least one hinge is between the gyroscopic element and the base. There is at least one piezoelectric crystal, preferably a bender element, having a base end, an outer end. A bender element provides an electrical signal as a function of bending. The base end of the crystal can be connected to the base and the crystal extends from the base with the crystal having a major plane transverse to the spin axis. The outer end of the crystal is connected to the gyroscopic element via a crystal restraint having a degree of freedom of movement parallel to the spin axis. Preferably, the crystal restraint is a wire connected on one end to the crystal and on the opposite end to the gyroscopic element. The restraint wire is preferably parallel to the spin axis.

25 Claims, 6 Drawing Sheets

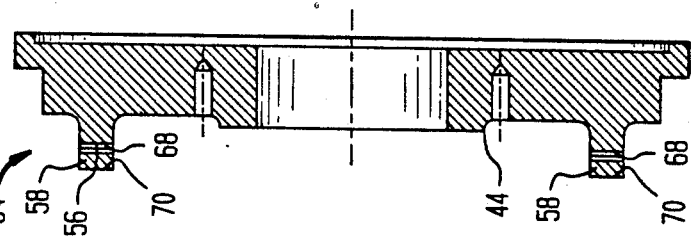
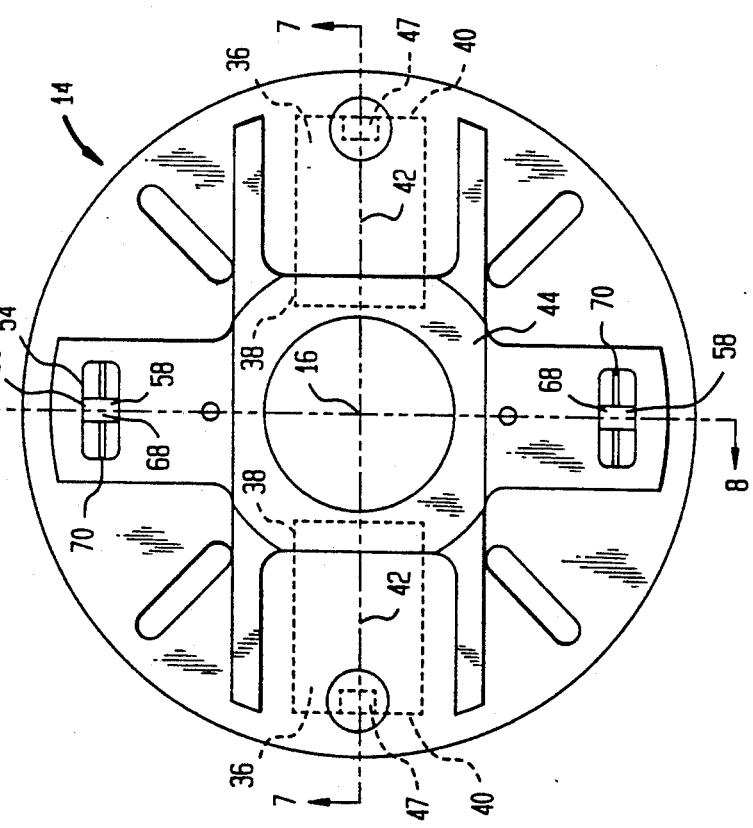
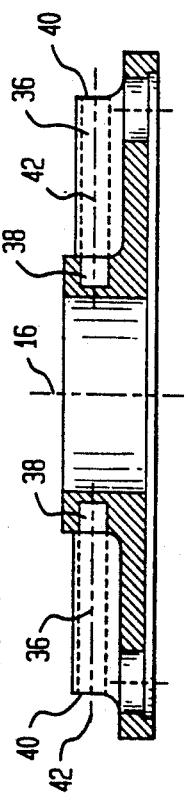

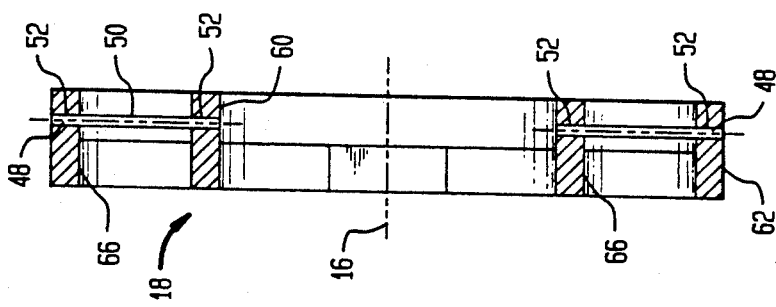
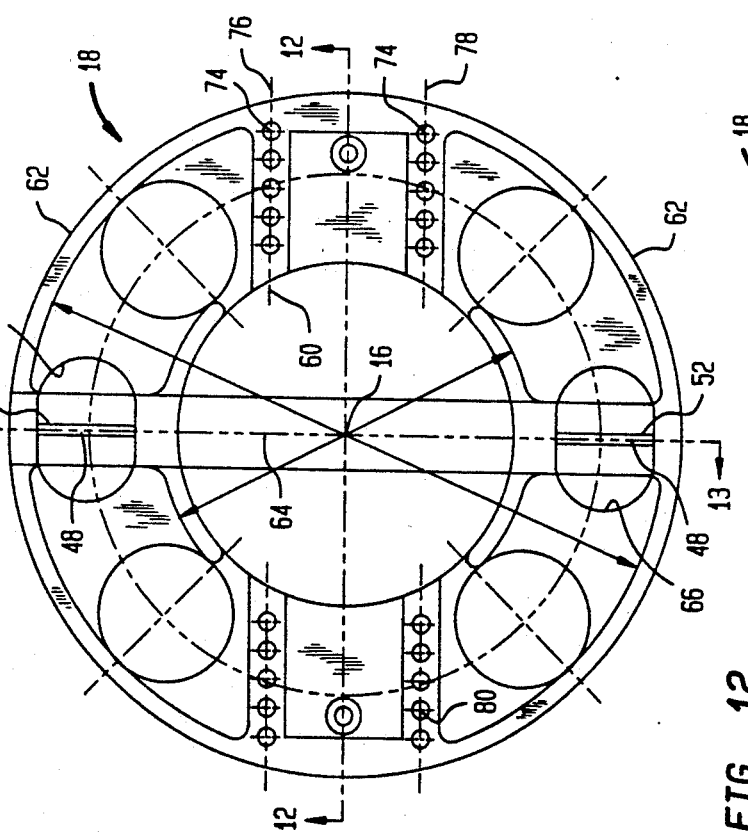
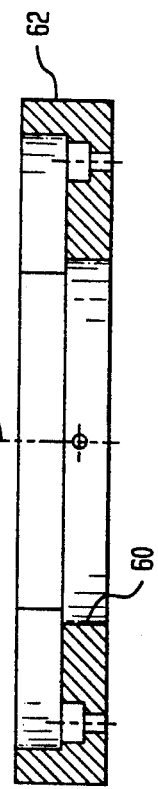

1

GYROSCOPE HAVING A SPECIFICALLY RESTRAINED PIEZOELECTRIC CRYSTAL

BACKGROUND OF THE INVENTION

1. Field of the Invention

The present invention relates to an improved gyroscope; more particularly, the invention relates to a gyroscope having at least one piezoelectric crystal and preferably a self-aligning gyroscopic element.

2. Description of the Related Art

Gyroscopes are known which comprise a gyroscopic element, also called a flywheel, and a spin motor. Such gyroscopes are disclosed to have two piezoelectric crystals mounted radial to the motor spin axis of the gyroscopes. The crystals are aligned at 180° apart, restrained on one end at the hub, and restrained by the gyroscopic element at a radially extending outer end. Such features are disclosed in the art, such as FIG. 1 of U.S. Pat. No. 4,601,205 and FIG. 5 of U.S. Pat. No. 4,311,046. The '046 patent also discloses that it is known to make a gyroscope with a flywheel attached to a base via flexible hinges.

U.S. Pat. No. 4,211,951 discloses a shear-type prestressed piezoelectric force transducer. This article comprises two piezoelectric elements parallel to the spin axis.

U.S. Pat. No. 4,621,529 discloses multi-sensor pickoff assembly including a gyroscopic element which has a spin axis. The assembly has a flexure hinge for resiliently mounting the element on the base. There is a piezoelectric beam which is mounted in a coaxial relation to the spin axis. The piezoelectric beam is adapted to generate an electrical signal proportional to the angular velocity of the navigation sensor about an axis perpendicular to the spin axis. There are means to restrain the piezoelectric beam in place. The piezoelectric beam is restrained between the base and the gyroscopic element. The gyroscopic element is maintained in place at the base by a keeper means which can include a pin perpendicular to the spin axis and restrained on either end with the piezoelectric element attached to the center of the pin.

In U.S. Pat. No. 4,715,227 which is commonly assigned and commonly invented with the '529 patent, the '529 is characterized as having had problems during operation. The embodiment having a trapezoidal shape piezoelectric beam was indicated to have two problems. The first problem arose due to the fact that the clamps in the piezoelectric crystals had different coefficients of expansion, thereby causing a mismatch to exist between the two different materials. Consequently, the piezoelectric beam tended to crack. The second problem found was that vibrations from the spindles and bearings of the multi-sensor assembly were transmitted to the gyroscopic element. These vibrations were in turn transmitted to the piezoelectric crystal beam resulting in a large amount of noise. This limited the performance of the assembly.

U.S. Pat. No. 4,715,227 disclosed a multi-sensor assembly with angular rate piezoelectric crystal beam mounted coaxial to the spin axis. In this assembly the crystal was in diamond shape. The crystal was held between the gyroscopic element and the base. It was trussed in the gyroscopic element between three wires perpendicular to the spin axis and in the base by a fourth wire, also perpendicular to the spin axis. Each of the wires was restrained at their ends and the piezoelectric crystal was secured intermediate of the ends of the wires between each wire, with each wire located at the point of the diamond shaped crystal. This gyroscope contained flexible hinges between the gyroscopic element and the base.

U.S. Pat. Nos. 4,197,737; 3,359,806; and 3,142,991 are cited as being of interest Small gyroscopes are known and desired in the art. Reference is made to Miller *Small Two-Axis Sensor Has Multiple Uses*, Aviation Week & Space Technology, Aug. 8, 1966, and Litton, *A gyro this small? Really?*. The Litton gyroscope is disclosed to be 0.910 inches in axial length and about 0.750 inches in diameter perpendicular to the spin axis.

As the above references indicate, there is a need for relatively small gyroscopes. However, in making gyroscopes small, care must be taken to be sure that precision and accuracy are maintained and improved. Additionally, it is desirable to manufacture small precision parts uniformly and economically.

SUMMARY OF THE INVENTION

The present invention relates to an improved gyroscope which can be small and made of a variety of materials. The gyroscope is simple having minimum number of parts yet avoids problems commonly found when using piezoelectric crystals. The design enables the gyroscope to be made of widely varying materials including polymeric materials and composites, having different coefficients of expansion.

The gyroscope of the present invention comprises a gyroscopic element mounted to a base which is mounted coaxially to a spin motor. Preferably at least one hinge is between the gyroscopic element and the base. There is at least one piezoelectric crystal, preferably a bender element, having a base end, an outer end. A bender element provides an electrical signal as a function of bending A preferred bender crystal comprises a planar configuration. The base end of the crystal can be connected to the base and the crystal extends from the base with the crystal having a major plane transverse to the spin axis. The outer end of the crystal is connected to the gyroscopic element via a crystal restraint means having a degree of freedom of movement parallel to the spin axis. Preferably, the crystal restraint means is a wire connected on one end to the crystal and on the opposite end to the gyroscopic element. The restraint wire is preferably parallel to the spin axis.

In a preferred embodiment there are at least two, and preferably two piezoelectric crystals which are spaced 180° apart in a common plane perpendicular to the spin axis. Preferably at least one flexible hinge connected between the base and the gyroscopic element. The flexible hinge is preferably a torsion wire mounted to allow the gyroscopic element to self-align relative to the spin axis. Preferably, there is a torsion wire at 90° to each crystal and radial to the spin axis. There is a suitable means to rotate the gyroscope about the spin axis which is preferably a motor.

The preferred restraint means of the present invention, between the piezoelectric crystals and the gyroscopic element, enables the gyroscope to be self compensating for differences in coefficient of expansion of the different materials. This is because the preferred restraint drives the crystal in only one degree of freedom; along the restraint wire which is preferably parallel to the spin axis.

An improvement of the gyroscope of the present invention comprises the gyroscopic element having a means to dynamically secure the gyroscopic element in an aligned position relative to the gyroscopic base. A preferred embodiment of the gyroscopic of the present invention is the use of a self-aligning gyroscopic element. The flexible hinge comprises a torsion wire which comprises a pivot section extending between two wire restraints. Both wire restraints are located in either the base or the gyroscopic element. There is a pivot means having a fulcrum. The pivot means is located in the element base or the gyroscopic element, opposite the element where the torsion wire is located. The pivot section is secured at a location at the fulcrum where the gyroscope is aligned.

Preferably the pivot sections of the torsion wire are oriented radial to the spin axis with the wire restraints located in the gyroscopic element. The fulcrum comprises a hardening material, preferably a polymeric material which hardens with time, such as a thermosetting polymer. The torsion wire is set into the hardening material. The gyroscopic element is aligned dynamically and the hardening material is hardened securing the torsion wire in an aligned position.

The use of the simple design, preferably with the restraints between the piezoelectric crystal and gyroscopic elements being parallel to the spin axis, enables different parts of the gyroscope to be made of any suitable material including polymeric materials. The different parts, such as the gyroscopic element and the housing and base, can be injection molded, and preferably precision injection molded. By making parts in such a way, the gyroscope can be made very small wherein the size is less than 1.5 and preferably less than 1.0 inch long along the spin axis, and less than 1.0 and preferably 0.75 inches long in any direction perpendicular to the spin axis. The gyroscope of the present invention is capable of operating at speeds of up to from 12,000 to 16,000 revolutions per minute.

The present invention includes a method of aligning the gyroscope having the self-aligning flexible hinge. The method of aligning the gyroscope comprises placing a soft, hardenable material at the fulcrum. The pivot section of the torsion wire is mounted in the soft, hardenable material. The gyroscope is rotated, the pivot section naturally locates to an aligned position in the soft material. The soft material hardens with the pivot section rigidly secured by the hardened material in aligned position.

BRIEF DESCRIPTION OF THE DRAWINGS

FIG. 6 is a top view of the base showing the piezoelectric crystal in phantom.

FIG. 7 is a sectional drawing along lines 7—7 of FIG. 3.

FIG. 8 is a sectional view along sectional 8—8 of FIG. 3.

FIG. 11 is a bottom view of the gyroscopic element.

FIG. 12 is a sectional view along lines 12—12 of FIG. 11.

FIG. 13 is a sectional view along lines 13—13 of FIG. 11.

DESCRIPTION OF THE PREFERRED EMBODIMENTS

The present invention will be understood by those skilled in the art with reference to FIGS. 1-13 which illustrate a preferred embodiment of the present invention.

Figure 1:
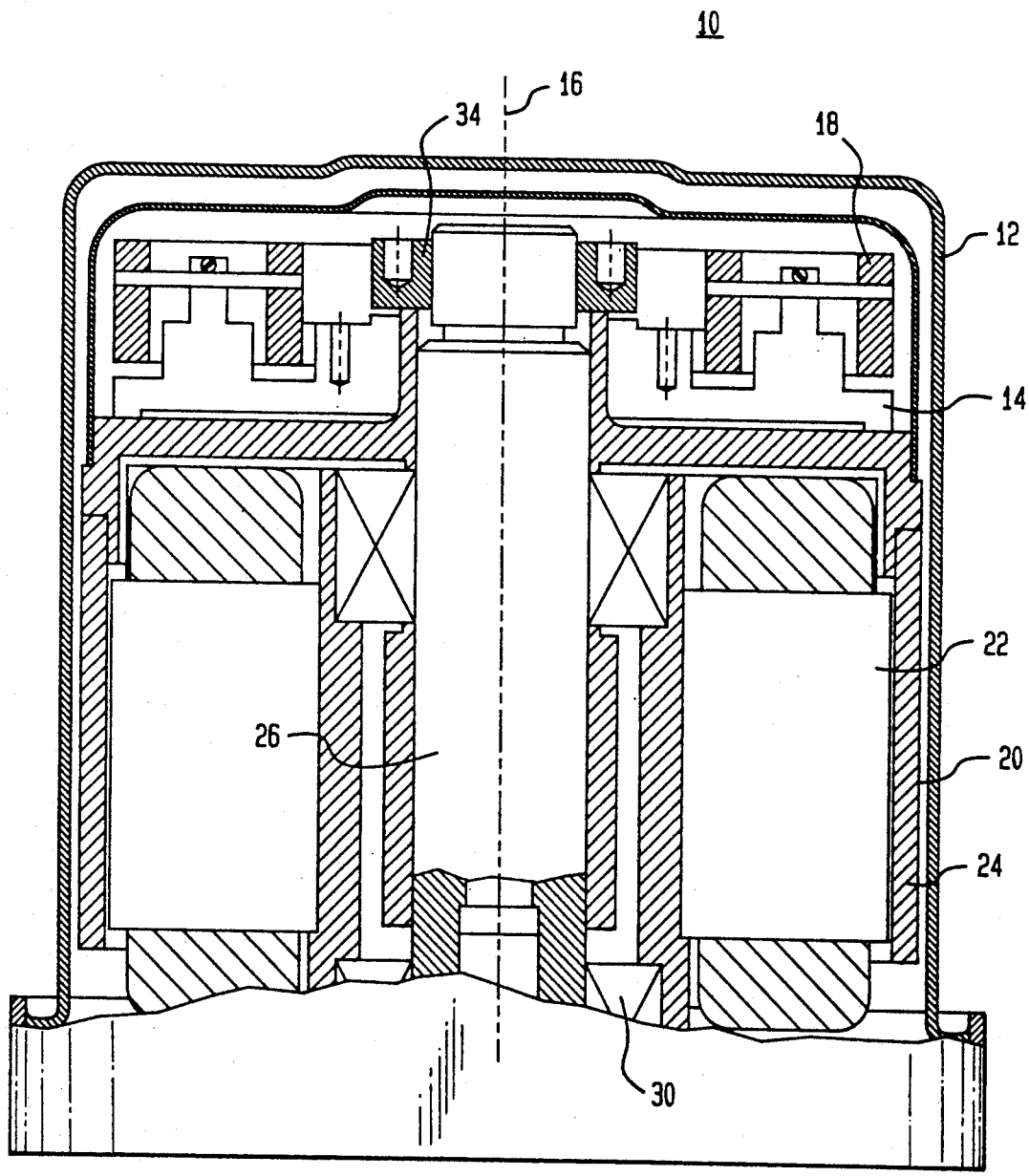
FIG. 1 is a partial schematic sectional view of the gyroscopic element mounted on the gyroscopic base and motor.
Figure 2:
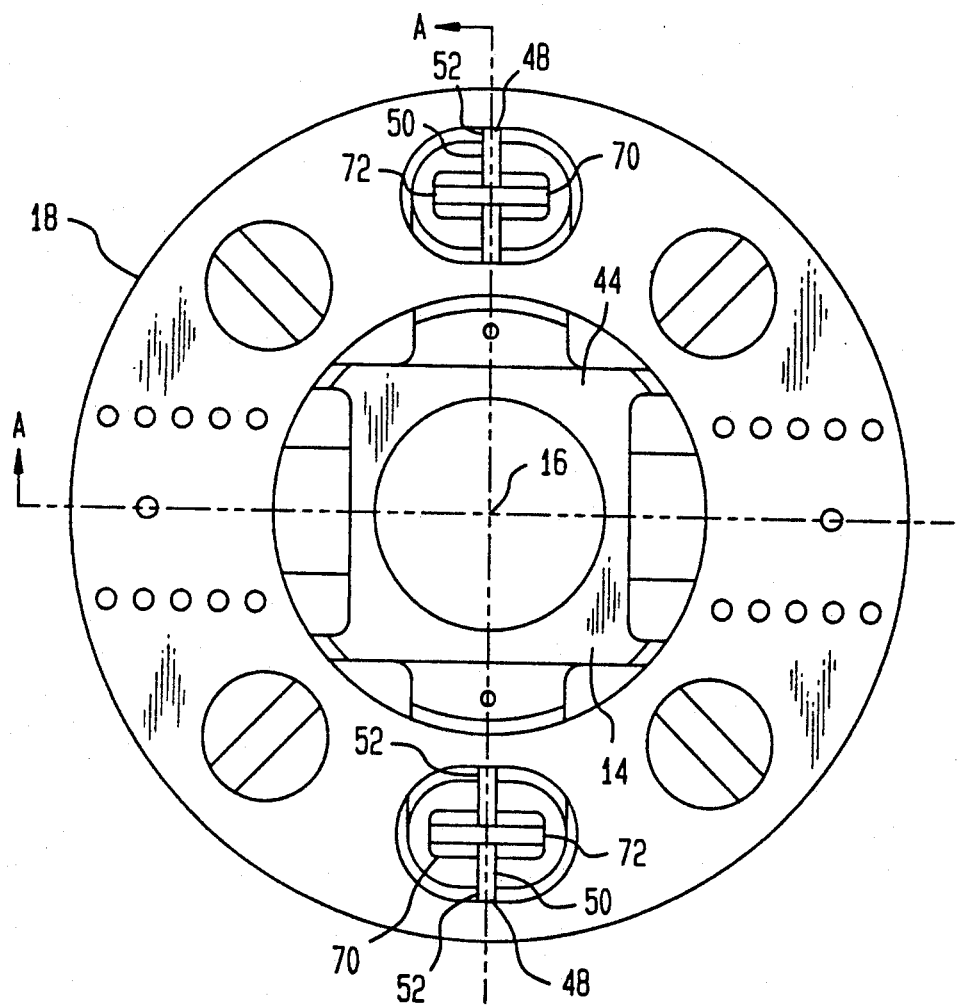
FIG. 2 is a top plan view of the gyroscope of the present invention.
Figure 3:
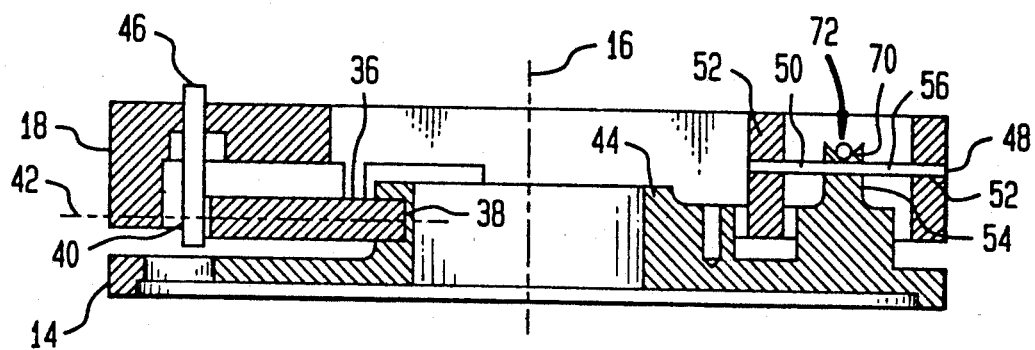
FIG. 3 is a sectional assembly along A—A of the embodiment of FIG. 1 the gyroscope of the present invention showing the gyroscope element mounted on the base.
Figure 4:
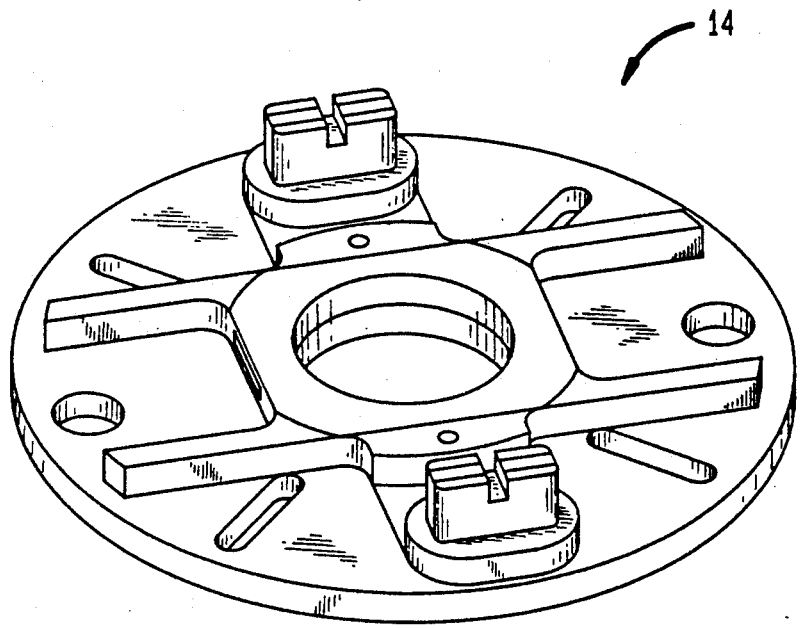
FIG. 4 is a view in perspective showing the top of the base.
Figure 5:
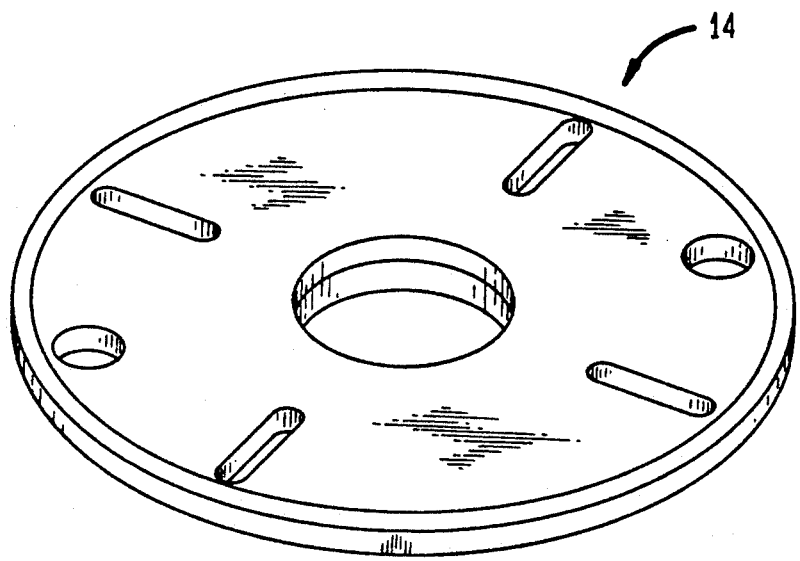
FIG. 5 is a view in perspective showing the bottom of the base.
Figure 9:
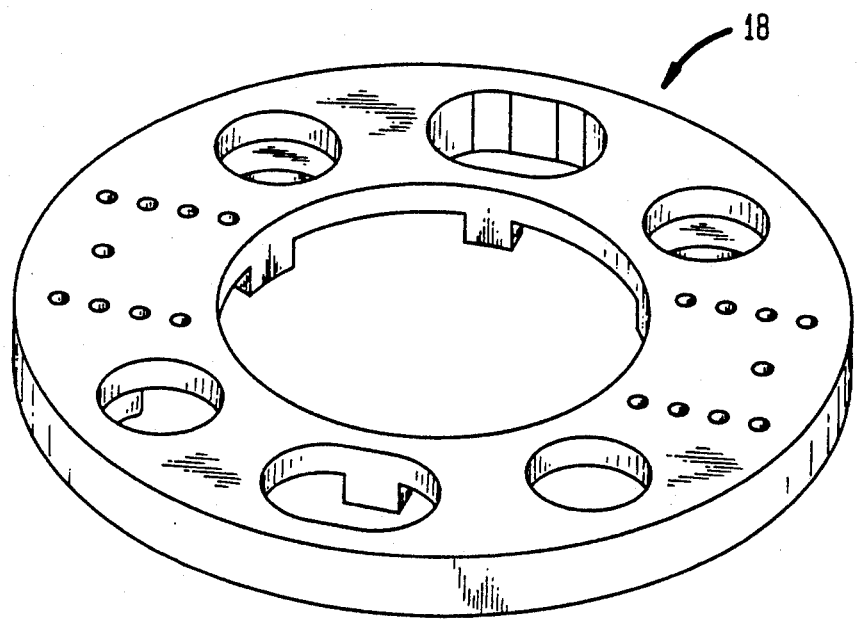
FIG. 9 is a view in perspective showing the top of the gyroscopic element.
Figure 10:
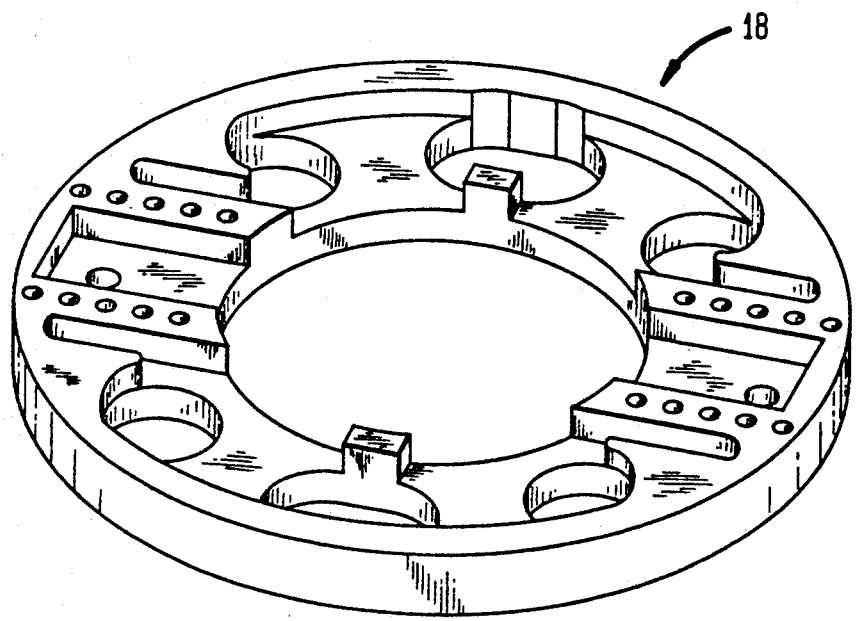
FIG. 10 is a view in perspective showing the bottom of the gyroscopic element.

Referring to FIG. 1, the gyroscope 10 of the present invention is contained in a suitable housing 12. Gyroscope 10 comprises a gyroscopic base 14 having a spin axis 16. The gyroscope 10 further comprises a gyroscopic element 18 in a coaxial relation with the base 14 as shown in FIGS. 2 and 3. The gyroscope is driven by a conventional motor 20.

The motor 20 is disposed to cause the gyroscope to rotate about spin axis 16. The motor is preferably a conventional hysteresis sychronous comprising a stator 22 and a rotor 24. Other suitable motors such as a DC motor can be used. The motor shaft 26 is coaxial with the spin axis. The motor can be journaled to the internal case portion of the motor through bearing means 30. The end of the shaft directed toward the gyroscopic element 18 is connected to gyroscopic base 14 at shaft/base connection 34. When the motor is energized the shaft 26 rotates causing gyroscopic base 14 to rotate.

Referring to FIGS. 2 and FIGS. 3, the gyroscope has at least one piezoelectric crystal 36 which comprises a crystal base end 38 and a crystal outer end 40. Preferably the piezoelectric crystal 36 is flat with the plane of the crystal perpendicular to the spin axis. Each crystal preferably has a crystal axis 42 transverse to and extending through the spin axis 16 from the crystal base end 38 to the crystal outer end 40. The gyroscopic base 14 can have an extension or hub 44 extending axially from the base. Preferably, the crystal base end 38 of each crystal 36 is connected to the gyroscopic base at hub 44 as shown in FIG. 3.

FIGS. 3-8 illustrate a preferred base 14. The crystal outer end 40 of the crystal 36 is connected to the gyroscopic element 18 by a suitable crystal restraint means. A preferred crystal restraint means is a restraint wire 46. The restraint wire 46 is connected to the piezoelectric crystal 36 at or near the crystal outer end 40. The restraint 46 can be connected to the crystal 36 by a suitable adhesive at crystal restraint cutout 47. The restraint wire 46 extends from the crystal 36 substantially parallel to the spin axis 16 in a direction away from the gyroscopic base 14 and toward the gyroscopic element 18, to which it is connected. The restraint wire 46 restrains movement of the piezoelectric crystal 36 in a plane perpendicular to spin axis 16 and permits movement in one degree which is parallel to the spin axis 16.

In the preferred embodiment as illustrated in FIGS. 6 and 7 are two piezoelectric crystals 36. The two piezoelectric crystals 36 are shown coaxial to the crystal axis 42 and are thereby 180° apart. The gyroscopic element 18 is connected to the hub 44 via the piezoelectric crystals 36 and the restraint wires 46.

Preferably, the gyroscopic element 18 is further connected to the base 14 through at least one flexible hinge. In the preferred embodiment shown in FIGS. 1-3, 10 and 11, the flexible hinge is a torsion wire 48 which preferably has a self aligning feature. The torsion wire 48 comprises a pivot section 50 extending between two torsion wire restraints 52. Both torsion wire restraints 52 are located in either the base 14 or the gyroscopic element 18. In the FIGS. 1-3, 10 and 11 both torsion wire restraints 52 are located in the gyroscopic element 18.

A preferred gyroscopic base 14 is shown in FIGS. 1, and 3-8. There are two piezoelectric crystals 36 having their major plane transverse to the spin axis 16 as are shown in phantom plan view in FIGS. 6 and 7.

Pivot means 54 has a fulcrum 56 is shown in the base 14. The pivot section 50 of the torsion wire 48 is illustrated to be located at the pivot means 54 (FIG. 3). Should the torsion wires be located in the base 14, then pivot means would extend from the gyroscopic element. The pivot section 50 is secured at the location at the fulcrum 56 with the gyroscope 10 is aligned. In a preferred embodiment the pivot section 50 of the torsion wires 46 are radially aligned at 90° to the spin axis 16. More preferably, there are two substantially straight torsion wires 48, which are coaxial to each other, located in the gyroscopic element 18 as shown in FIGS. 11, 13.

The fulcrum 56 preferably comprises a hardening material 58 (FIG. 8). The hardening material is initially soft and is disposed to receive the pivot section 50 of the torsion wire 48. The torsion wire is set in the hardening material 58 and then aligned. The hardening material is hardened to set the torsion wire in place in an aligned position. The hardening material is preferably a polymeric material. Preferred materials include thermosetting and thermoplastic materials, with thermosetting materials most preferred. Preferred materials include polyepoxide, polyurethanes, phenolic resins, polyester resins, and the like. The specific preferred hardening material is a thermosetting epoxy or phenolic resin which hardens in about 5 to 6 minutes at from 125° to 250° and preferably 150° to 200° F.

A preferred gyroscopic element 18 is illustrated in FIGS. 1-3 and 9-13. This element is disc-like having an open center 60 and an outer circumference 62. The two piezoelectric crystals located in the base 14 are 180° apart and have coaxial crystals axes 42. There are two torsion wires 48 preferably located in base 18 along a common axis 64 which is perpendicular to the spin axis 16. Each torsion wire 48 is secured in a torsion wire cavity 66 passing axially at least partially through the gyroscopic element. Torsion wire 48 is restrained in its respective torsion wire cavity 66 by suitable means. Preferably, the torsion wires 48 are molded into the gyroscopic element 18. The torsion wires are restrained at torsion wire restraint 52. Each torsion wire pivot section 50 extends between the torsion restraints 52 within torsion wire cavity 66. Preferred torsion wires are made of tungsten and have a diameter of from 2 to 20 mils and preferably 6 to 10 mils with 8 mils most preferred.

Pivot means 54 are located in the base 14 at corresponding to locations to the torsion wires 48. As shown in FIGS. 6 and 8, fulcrums 56 of the pivot means 54 are coaxial along the torsion wire axis 64 perpendicular to the spin axis 16. They are located at the top of the gyroscopic base 14 facing the gyroscopic element 18. The fulcrums 56 extend from the gyroscopic base 14 and preferably have a fulcrum channel 68 which extends coaxial to the torsion wire axis 64. The pivot section 50 extends across the torsion wire cavity 66 at a radial distance from the spin axis 16 corresponding to the location of the fulcrum channel 68. At least part of fulcrum channels 68 are from 0.0001 to 0.01 inches wider than the diameter of the torsion wire 48. The fulcrum channels 68 are preferably a "V"-shaped groove. When the gyroscopic element 18 is placed on the base 14 the torsion wires 48 are matched opposite corresponding fulcrums 56 with the pivot section 50 fitting in the fulcrum channel 68. The fulcrum channel 68 can contain a hardening material 58.

A suitable means maintains torsion wire 48 in fulcrum channel 68. Preferably, there is a capping means which is placed on top of the torsion wire 48 embedded in hardening material 58. Such a capping means is illustrated in FIGS. 1-3 and 6. The preferred capping means is a groove 70 at the top of fulcrum 56. Preferably, the groove is perpendicular to the fulcrum channel 68. A cap wire 72 is placed in groove 70. A suitable means fastens cap wire 72 on groove 70. Preferably, this fastening means is fast curing ambient temperature polymer glue, such as fast curing epoxy resin. Cap wire 72 prevents the torsion wires 48 from coming out of the channel 68 during alignment of the gyroscopic element 18. The cap wire 72 then remains part of the gyroscopic element. Upon alignment of the gyroscopic element 18, the cap wire 72 is part of the total mass and does not affect accuracy or precision of the gyroscope 10.

The gyroscope 10 is aligned by rotating the assembly of the gyroscopic element 18 on base 14 with the pivot section 50 of each wire 48 located and secured in the pivot means in the base. The gyroscope motor 20 causes the assembly of the base 14 and the gyroscopic element 18 to spin and the torsion wires 48 naturally seek an aligned location within the hardening material 58. The gyroscope is permitted to rotate with the pivot sections 50 in an aligned position until the hardening material 58 hardens sufficiently so that the pivot section 50 remains in place when the rotation stops. In this way the gyroscopic element is self-aligned and need not be further aligned.

The gyroscope further comprises a means to easily be balanced with regard to pendulosity and tip-to-tip balance. Pendulosity is the tendency of the radial plane through the gyroscopic element 18 when *vertical* to move at an angle to the spin axis 16 upon rotation. Tip-to-tip imbalance is the tendency of the radial plane through the gyroscopic element 18 when *horizontal* to move at an angle to the spin axis 16 upon rotation. Balancing pendulosity and tip-to-tip can be accomplished by having suitable means to add weights to the gyroscopic element 18. A useful and easy way to add weights is to have a plurality of balance holes 74 as shown in FIG. 11. The holes can be in any suitable pattern, i.e., radial, or parallel rows. Preferably the holes 74 extend in rows along two parallel cords in a plane perpendicular to the spin axis 16, such as cords 76 and 78 extending parallel to axis 16 of the gyroscopic element 18. Weights 80 can be added and secured in different holes 74 at different positions parallel to axis 16 to substantially balance the gyroscope for pendulosity and/or tip-to-tip balance. In essence, the center of gravity of the gyroscopic element 18 can be moved to the center of restraint of the element.

The simple construction of the gyroscope of the present invention can enable it to be made of plastic. By plastic it is meant thermoplastic materials including thermoplastic esters, polyamides, polyolefins, polystyrenes, vinyl plastics such as polyvinyl chloride, fluoropolymers, such as tetrafluoroethylene, polychlorotriethylene, polyvinylidine, polyvinyl chloride, acrylic polymers, polyamides, cellulose polymers, aromatic hetrochain plastics, and the like. Particularly preferred are hetrochain thermoplastics such as polyphenylene oxides and polyphenylene sulfides. A preferred composition is polyphenylene sulfide comprising a suitable filler, preferably fiberglass and/or moneral filler. There can be from up to 100% and preferably 10 to 50 weight percent, preferably from 10 to 50 percent based on the weight of the polymer. A preferred composition is Ryton ® 7 sold by The Phillips 66 Company.

While exemplary embodiments of the invention have been described, the true scope of the invention is to be determined from the following claims.

What is claimed is:

1. A gyroscope comprising:
a gyroscopic base having a spin axis;
a hinged gyroscopic element connected to the gyroscopic base;
at least one piezoelectric crystal having a base end, an outer end and a crystal axis, the base end of the crystal being connected to the gyroscopic base and extending from the base with the crystal axis being transverse to the spin axis, and the outer end of the crystal connected to the gyroscopic element via a crystal restraint means having only one degree of freedom of movement parallel to the spin axis.

2. A gyroscope comprising:
a gyroscopic base having a spin axis;
a hinged gyroscopic element connected to the gyroscopic base; at least one piezoelectric crystal having a base end, an outer end and a crystal axis, the base end of the crystal being connected to the gyroscopic base and extending from the base with the crystal axis being transverse to the spin axis, and the outer end of the crystal connected to the gyroscopic element via a crystal restraint means having a degree of freedom of movement parallel to the spin axis wherein the crystal restraint means is a wire connected on one end to the crystal and on the opposite end to the gyroscopic element.

3. The gyroscope as recited in claim 2 wherein the crystal restraint wire connected is parallel to the spin axis.

4. The gyroscope as recited in claim 2 wherein there are at least two piezoelectric crystals.

5. The gyroscope as recited in claim 4 wherein there are two piezoelectric crystals 180 degrees apart.

6. The gyroscope as recited in claim 2 further comprising at least one flexible hinge connected between the base and the gyroscopic element.

7. The gyroscope as recited in claim 6 wherein the gyroscopic element is capable of dynamic self alignment at said hinge.

8. The gyroscope as recited in claim 6 wherein said hinge is at least one torsion wire.

9. The gyroscope as recited in claim 8 wherein there are two piezoelectric crystals 180 degrees apart, and said at least one torsion wire is at 90 degrees to each crystal in a plane transverse to the spin axis.

10. The gyroscope as recited in claim 9 wherein said hinge is a torsion wire.

11. The gyroscope as recited in claim 2 further comprising a means to rotate the gyroscope about the spin axis.

12. The gyroscope as recited in claim 11 wherein the means to rotate is a motor.

13. The gyroscope as recited in claim 2 wherein the gyroscopic element is made of plastic.

14. The gyroscope as recited in claim 13 wherein the gyroscopic base is made of plastic.

15. The gyroscope as recited in claim 2 wherein the gyroscopic element further comprises a plurality of balance holes.

16. The gyroscope as recited in claim 15 further comprising a sufficient number of weights located in the balance holes to substantially balance the gyroscope.

17. An improved gyroscope of the type having a gyroscopic base having a spring axis, a gyroscopic element in a coaxial relation with the base, a means for sensing changes between the base and the gyroscopic element, and a flexible hinge between the base and the gyroscopic element wherein the improvement comprises the flexible hinge being a torsion wire comprising a pivot section extending between two wire restraints, with both wire restraints located in either the base or in the gyroscopic element, and a pivot means having a fulcrum, the pivot means being located in the base or in the gyroscopic element opposite the location of the torsion wire, the pivot section being secured at location at the fulcrum where the gyroscopic element is aligned.

18. The improved gyroscope as recited in claim 17 wherein the pivot section of the gyroscope is oriented radially to the spin axis.

19. The improved gyroscope as recited in claim 17 wherein the two wire restraints are located in the gyroscopic element.

20. The improved gyroscope as recited in claim 17 wherein the means to align comprises the fulcrum comprises a hardening material in which the pivot section of the torsion wire is located.

21. The improved gyroscope as recited in claim 20 wherein the gyroscopic element is aligned with the torsion wire in an aligned position and the hardening material is hardened.

22. The improved gyroscope as recited in claim 21 wherein the gyroscope is capable of operating at from 12,000 to 16,000 revolutions per minute.

23. The improved gyroscope as recited in claim 20 wherein the size is less than one inch along the spin axis and less than 1.0 inches in any direction perpendicular to the spin axis.

24. The improved gyroscope as recited in claim 17 wherein the base and the gyroscopic element are substantially made of a polymeric material.

25. A method of aligning a gyroscope comprising a base having a spin axis, a gyroscopic element in a coaxial relation with the base, a means for sensing changes between the base and the gyroscopic element, and a flexible hinge comprising a torsion wire having a pivot section extending between two wire restraints located in the base or in the gyroscopic element, with both wire restraints located in the base or in the gyroscopic element, and a pivot means having a fulcrum, the pivot means being located in the base or in the gyroscopic element opposite the location of the torsion wire, comprising the steps of:
placing a soft hardenable material at the fulcrum;

mounting the pivot section in the soft hardenable material;

rotating the gyroscope to cause the pivot section to locate to a position in the soft material where the gyroscope is aligned; and hardening the soft material with the pivot section rigidly secured by the hardened material in the aligned position.

* * * * *